(12) United States Patent
Wan et al.

(10) Patent No.: US 8,200,613 B1
(45) Date of Patent: *Jun. 12, 2012

(54) APPROACH FOR PERFORMING METADATA RECONCILIATION

(75) Inventors: Winnie Tak Yu Wan, Menlo Park, CA (US); Adrian Graham Scott, San Mateo, CA (US); Zili Fan, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2482 days.

This patent is subject to a terminal disclaimer.

(21) Appl. No.: 10/293,627

(22) Filed: Nov. 12, 2002

Related U.S. Application Data

(60) Provisional application No. 60/395,726, filed on Jul. 11, 2002.

(51) Int. Cl.
*G06F 17/30* (2006.01)
*G06F 7/00* (2006.01)
(52) U.S. Cl. ........................................ 707/601; 707/602
(58) Field of Classification Search ................ 707/1–10, 707/100–104.1
See application file for complete search history.

(56) References Cited

U.S. PATENT DOCUMENTS

| 6,493,720 B1 * | 12/2002 | Chu et al. ................. 707/104.1 |
| 2001/0034733 A1 * | 10/2001 | Prompt et al. ................ 707/102 |
| 2004/0064456 A1 * | 4/2004 | Fong et al. .................... 707/100 |

* cited by examiner

*Primary Examiner* — Tim T Vo
*Assistant Examiner* — Sangwoo Ahn
(74) *Attorney, Agent, or Firm* — Hickman Palermo Truong & Becker LLP; Edward A. Becker

(57) ABSTRACT

An approach for reconciling a data warehouse includes automatically identifying, based upon a change made to a definition of an object, one or more other objects in the data warehouse that are affected by the change made to the definition of the object. The object and the other objects may be any type or form of data, for example, database tables or routines, and the invention is not limited to any particular type of object. Dependency analysis is used to evaluate dependency data to identify the one or more other objects affected by the change made to the definition of the object. The dependency data specifies dependencies between the object and the one or more other objects. The dependency data may also specify dependencies between the one or more other objects. As described in more detail hereinafter, the dependency data used may vary depending upon a particular function to be performed. A transformation mechanism may also be updated, in response to the change made to the definition of the object, so that the transformation mechanism can generate the one or more other objects based upon a new object defined by the changed definition of the object. Data that defines the one or more other objects may also be updated to reflect the change made to the definition of the object.

33 Claims, 6 Drawing Sheets

APPROACH FOR PERFORMING METADATA RECONCILIATION

RELATED APPLICATION AND CLAIM OF PRIORITY

This application claims benefit of U.S. Provisional Application entitled "Automation of Data Warehouse Reconciliation by Means of Dependency Analytics", No. 60/395,726, filed Jul. 11, 2002. The entire contents of this prior application is hereby incorporated by reference.

FIELD OF THE INVENTION

This invention relates generally to information management systems and, more specifically, to an approach for performing metadata reconciliation in data warehousing environments.

BACKGROUND OF THE INVENTION

A data warehouse is a centralized collection of data. Data warehouses are ideally suited for supporting management decision-making in business organizations since data from disparate and/or distributed sources may be stored and analyzed at a central location. For example, a financial services organization may store and aggregate in a data warehouse large amounts of financial data obtained from its regional office databases around the world. Various analytical and reporting tools may then be used to process the aggregated data to present a coherent picture of business conditions at a particular point in time, and thereby support management decision making of the financial services organization.

Data warehouses are typically implemented on a Database Management System (DBMS) that includes a large database for storing the data, a database server for processing queries against the database and one or more database applications for accessing the DBMS. The types of applications that are provided for a data warehouse vary widely, depending upon the requirements of a particular implementation. For example, a data warehouse may include an application for configuring the database schema used for the data warehouse database. As another example, a data warehouse may include an application for extracting data from source databases and then storing the extracted data in the data warehouse. A data warehouse may also include an application for generating reports based upon data contained in the data warehouse.

One significant problem with data warehouses has been metadata reconciliation. As used herein, the term "metadata" refers generally to data that defines other data. In the context of data warehousing, the term "metadata" refers to data that defines data that is stored in a source database or in a data warehouse. For example, in the context of data warehousing, metadata may include the database schema used in a source database or in a data warehouse. As described in more detail hereinafter, metadata may define not only the final data that is stored in the data warehouse, but also intermediate data and structures, such as staging tables, that are used to determine the final data. The term "metadata reconciliation" generally refers to updating the metadata of an object to reflect changes made to the metadata of another object. The need for metadata reconciliation arises when there is a relationship between the two objects and the relationship is affected by the change to the metadata of one of the objects. For example, suppose that the definition (metadata) of object B depends upon the definition (metadata) of object A. A change to the metadata of object A disrupts the relationship between objects A and B. Metadata reconciliation may be used to update the metadata for object B to reflect the change made to the metadata for object A. In the context of data warehousing, metadata reconciliation refers to updating the metadata for a data warehouse to reflect changes made to the definition of an object that one or more other objects in the data warehouse rely upon. The object may be external to the data warehouse, e.g., a source database object, or internal to the data warehouse. For example, changing the design of a data warehouse may change the definition of an object within the data warehouse, such as an intermediate table. When the definition of an object changes, the metadata for a data warehouse must be updated to reflect the changes made to the definition of the object before additional data can be imported into the data warehouse. Otherwise, attempting to store new data that conforms to the updated definition will cause errors in the data warehouse.

For example, the database schema used in a data warehouse is designed based upon the database schemas that define the corresponding source databases. Each source database may have its own (different) database schema and all of the source data must be aggregated onto a single database in the data warehouse. To achieve this result, a data warehouse typically includes a transformation mechanism, usually in the form of a data warehouse software application or module, that is configured to transform source data, that conforms to the database schema used in the source databases, into data that conforms to the database schema used in the data warehouse. The extent of transformation that must be performed generally varies depending upon size of the data warehousing deployment and differences between the source database schemas and the database schema used in the data warehouse. For example, in data warehousing deployments with large numbers of disparate source databases, the transformation process can be very complex.

Data warehouses are conventionally maintained manually by warehouse designers who, in response to a change made to a source database schema or the design of the data warehouse, must first identify the data warehouse objects, such as tables, transformation mechanisms and applications affected by the change, including any temporary objects and tables, and then update these temporary objects, tables, applications and the data warehouse schema to reflect the change made to the source database schema or the design of the data warehouse. Updating the database schema of the data warehouse can be very complex and require a significant amount of human resources, even just to identify the changes in metadata that must be made. For example, a warehouse designer may have to manually inspect a large number of database schema objects, including objects involved in the transformations, to determine which of these objects rely upon the objects that have been modified. This problem may be compounded when, because of complex data dependencies in the data warehouse, changes made to the database schema of the data warehouse affect other database schema objects that then must also be updated. Thus, changes to a database schema of a source database, or to the design of a data warehouse, that initially appear to directly affect only a few database schema objects in a data warehouse may in practice indirectly affect large numbers of database schema objects in the data warehouse. Hence, even seemingly small changes to the schema of source databases can require a significant amount of human resources to reconcile data warehouse metadata.

Based upon the foregoing, there is a need for an approach for reconciling metadata for a data warehouse that does not suffer from the limitations in prior approaches. There is a particular need for an approach for reconciling metadata for a data warehouse that avoids the high human resource costs associated with manually identifying and implementing changes that need to be made to reconcile metadata for a data warehouse.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. DEPENDENCY ANALYSIS
III. DEPENDENCY MANAGEMENT
IV. IMPLEMENTATION MECHANISMS

I. OVERVIEW

An approach for reconciling a data warehouse is performed by automatically identifying, based upon a change made to a definition of an object, one or more other objects in the data warehouse that are affected by the change made to the definition of the object. The object and the other objects may be any type or form of data, for example, database tables or routines, and the invention is not limited to any particular type of object. Furthermore, the object may be external or internal to the data warehouse.

According to one embodiment of the invention, dependency analysis is used to evaluate dependency data to identify the one or more other objects affected by the change made to the definition of the object. The dependency data specifies dependencies between the object and the one or more other objects. The dependency data may also specify dependencies between the one or more other objects. As described in more detail hereinafter, the type and characteristics of the dependency data used may vary depending upon a particular function to be performed in the data warehouse. For example, different dependency data may be used for the functions of reconciliation, validation, generation and deployment.

According to another embodiment of the invention, a transformation mechanism is updated, in response to the change made to the definition of the object, to enable the transformation mechanism to generate one or more new other objects based upon a new object defined by the changed definition of the object. According to another embodiment of the invention, data that defines the one or more other objects is updated to reflect the change made to the definition of the object.

Figure 1:
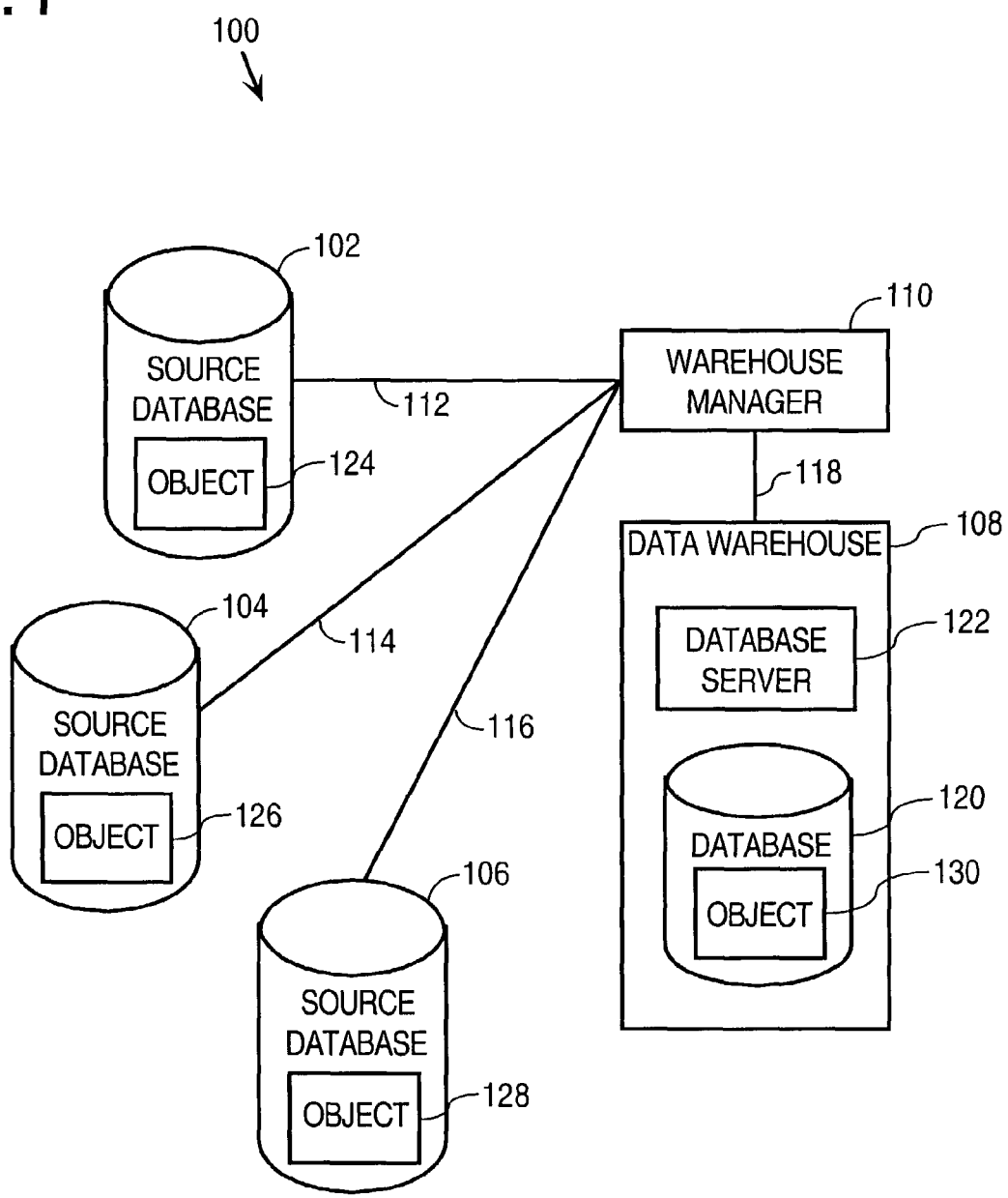
FIG. 1 is a block diagram that depicts a data warehouse arrangement, according to an embodiment of the invention.

FIG. 1 is a block diagram that depicts a data warehousing arrangement 100 according to an embodiment of the invention. Arrangement 100 includes sources databases 102, 104, 106, a data warehouse 108 and a warehouse manager 110. Source databases 102, 104, 106 are communicatively coupled to warehouse manager 110 via links 112, 114, 116, respectively. Warehouse manager 110 is communicatively coupled to data warehouse 108 via a link 118.

Source databases 102, 104, 106 may be part of one or more database management systems, e.g., with database servers, that are not depicted in the figures nor described herein for purposes of explanation. Source databases 102, 104, 106 may contain any type of data in any form and the invention is not limited to any particular type or form of data. Also, embodiments of the invention are applicable to any number of data sources that may be of the same or different types.

Data warehouse 108 includes a database 120 and a database server 122. Database 120 stores data and database server 122 is configured to process queries against database 120. For purposes of explanation, embodiments of the invention are depicted in the figures and described in the context of a single data warehouse 108 having a single database 120 and a single database server 122. The invention, however, is not limited to this example arrangement and embodiments of the invention are applicable to data warehousing arrangements with any number of data warehouses, each having any number of databases and database servers. Furthermore, data warehouse 108 may be configured with other components that are not depicted in the figures nor described herein, depending upon the requirements of a particular application.

For purposes of explanation, links 112, 114, 116 are depicted in FIG. 1 as direct connections. Links 112, 114, 116, may however, be implemented by any medium or mechanism that provides for the exchange of data between source databases 102, 104, 106 and data warehouse 108, respectively. Examples of links 112, 114, 116 include, without limitation, a network such as a Local Area Network (LAN), Wide Area Network (WAN), Ethernet or the Internet, or one or more terrestrial, satellite or wireless links. Furthermore, depending upon a particular implementation, links 112, 114, 116 may not be physical connections, but rather routine calls or any other mechanisms used by computer software routines to exchange information.

Source databases 102, 104, 106, data warehouse 108 and warehouse manager 110 may be located on separate nodes, for example in a distributed computing environment, or co-located on a single node, depending upon the requirements of a particular application. The invention is not limited to any particular physical arrangement of source databases 102, 104, 106, data warehouse 108 and warehouse manager 110.

Warehouse manager 110 generally manages data warehouse 108 and may perform a variety of functions, depending upon the requirements of a particular application. Example functions include, without limitation, configuring data warehouse 108, storing data to and retrieving data from data warehouse 108 and generating reports based upon data stored in data warehouse 108.

According to one embodiment of the invention, warehouse manager 110 is configured to receive data (including metadata) from source databases 102, 104, 106, transform the data into other data, and store the other data on data warehouse 108. The type of transformation performed by warehouse manager 110 may vary depending upon the requirements of a particular application and the invention is not limited to any particular transformation.

For example, suppose that source databases 102, 104, 106 store objects 124, 126, 128, respectively, that each conforms to a database schema for source databases 102, 104, 106. Thus, object 124 conforms to the database schema associated with source database 102, object 126 conforms to the database schema associated with source database 126 and object 128 conforms to the database schema associated with source database 128. Suppose further that database 120 stores an object 130 that conforms to a database schema for data warehouse 108. For purposes of explanation, it is assumed that the database schemas for source databases 102, 104, 106 are different than the database schema for data warehouse 108. For example, the database schemas for source databases 102, 104, 106 may define objects 124, 126, 128 as database tables that have a different structure than object 130, which may also be a database table.

According to one embodiment of the invention, warehouse manager 110 is configured to receive and transform objects 124, 126, 128, that conform to the database schemas for source databases 102, 104, 106, respectively, into object 130 that conforms to the database schema for data warehouse 108. This transformation may include, but is not limited to, aggregating data, deleting data or adding data. For example, in the context where objects 124, 126, 128 and object 130 are database tables, respectively, warehouse manager 110 may be configured to combine the three database tables to create a single database table. This may require combining rows of data, deleting rows of data, or adding rows of data to create the target database table. For example, suppose that objects 124, 126, 128 each include address data, and more specifically, object 124 includes four lines of address data and objects 126, 128 each include three lines of address data. Suppose further that the database schema for data warehouse 108 specifies that object 130 is to have three lines of address data. In this situation, warehouse manager 110 processes the four lines of address data contained in object 124 to create three lines of address data that can be aggregated with the address data from objects 126, 128 to conform to the database schema for data warehouse 108. For example, warehouse manager 110 may combine two of the four address lines into a single address line to create the necessary three address lines.

Figure 2:
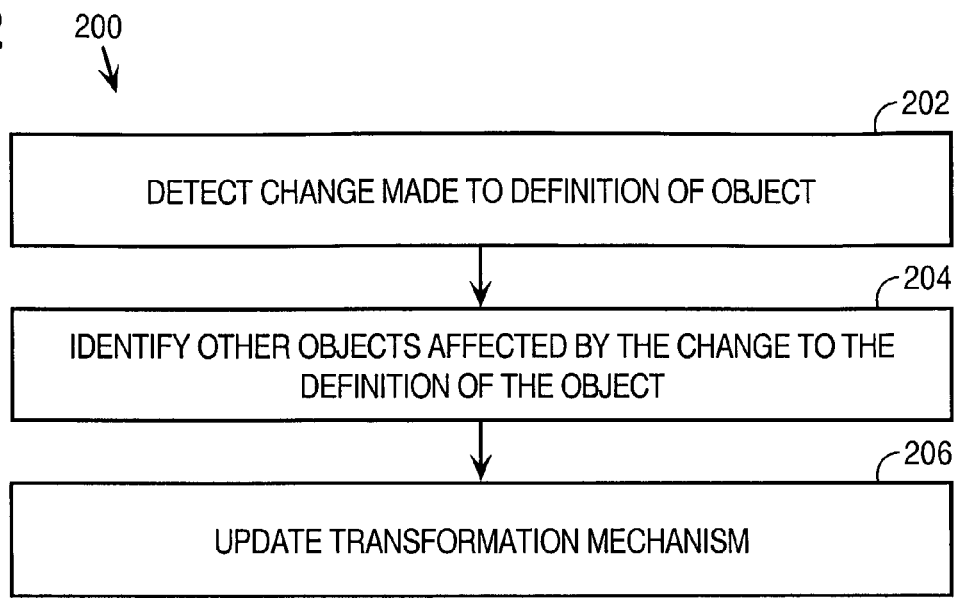
FIG. 2 is a flow diagram that depicts an approach for reconciling a data warehouse, according to an embodiment of the invention.

According to one embodiment of the invention, in response to a change made to any of the database schemas used by source databases 102, 104, 106, a transformation mechanism used by warehouse manager 110 is updated to reflect the change so that warehouse manager 110 can transform new data, that conforms to the source database schemas used by source databases 102, 104, 106, into data that conforms to the database schema used by data warehouse 108. This may involve, for example, importing the updated database schemas for source databases 102, 104, 106 into warehouse manager 110 and then identifying the impact on objects in data warehouse 108. The metadata that defines the objects affected by the changes to the database schemas for source databases 102, 104, 106 is then be updated to reflect the changes. FIG. 2 is a flow diagram 200 that depicts this approach. In step 202, a change made to the database schema for source database 102 is detected.

In step 204, one or more other objects affected by the change to the database schema for source database 102 are identified. In the present example, object 130 is identified as being affected by the change to the database schema for source database 102 since object 130 is generated, at least in part, from object 124.

In step 206, a transformation mechanism contained in warehouse manager 110 is updated to reflect the change made to the database schema for source database 102. In the present example, the updated transformation mechanism allows warehouse manager 110 to generate a new version of object 130 from a new version of object 124 that conforms to the database schema for source database 102, object 126 and object 128. The particular manner in which the transformation mechanism in warehouse manager 110 is updated may vary depending upon the architecture of warehouse manager 110 and the requirements of a particular application.

This approach may also be used in situations where a change is made to the definition of objects within data warehouse 108, for example, if the design of data warehouse 108 is changed.

Figure 3:
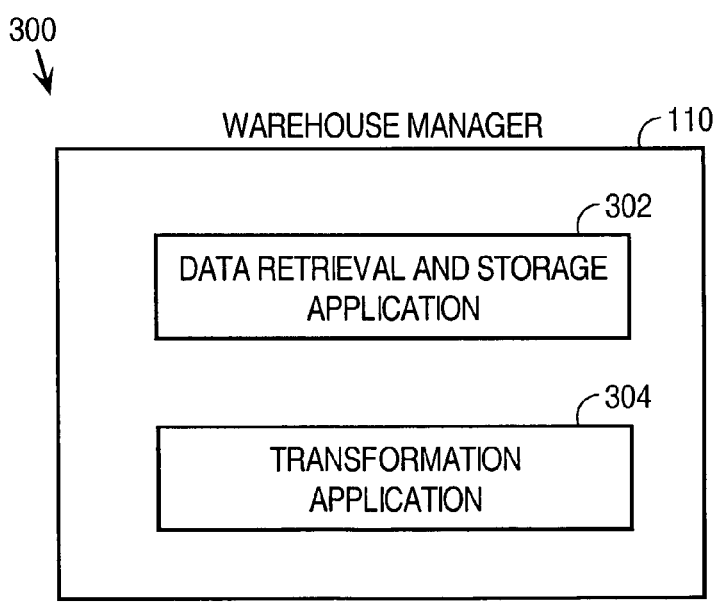
FIG. 3 is a block diagram that depicts a warehouse manager, according to an embodiment of the invention.

FIG. 3 is a block diagram 300 that depicts an example implementation of warehouse manager 110 according to an embodiment of the invention. In this example, warehouse manager 110 includes both a data retrieval and storage application 302 and a transformation application 304. Data retrieval and storage application 302 is configured to retrieve data, e.g., objects 124, 126, 128, from source databases 102, 104, 106. Data retrieval and storage application 302 is also configured to store and retrieve data from data warehouse 108. For example, data retrieval and storage application 302 is configured to store and retrieve object 130 to and from data warehouse 108.

Transformation application 304 is configured to perform the aforementioned transformations of data. For example, transformation application 304 is configured to transform objects 124, 126, 128, that conform to the database schemas for source databases 102, 104, 106, into object 130 that conforms to the database schema for data warehouse 108. With this arrangement, warehouse manager 110 causes transformation application 304 to be updated to reflect changes made to the database schemas for source databases 102, 104, 106 that define objects 124, 126, 128.

Warehouse manager 110 and its constituent components, i.e., data retrieval and storage application 302 and transformation application 304 may be implemented in computer hardware, computer software, or any combination of computer hardware or software and the invention is not limited to any particular implementation.

Figure 4:
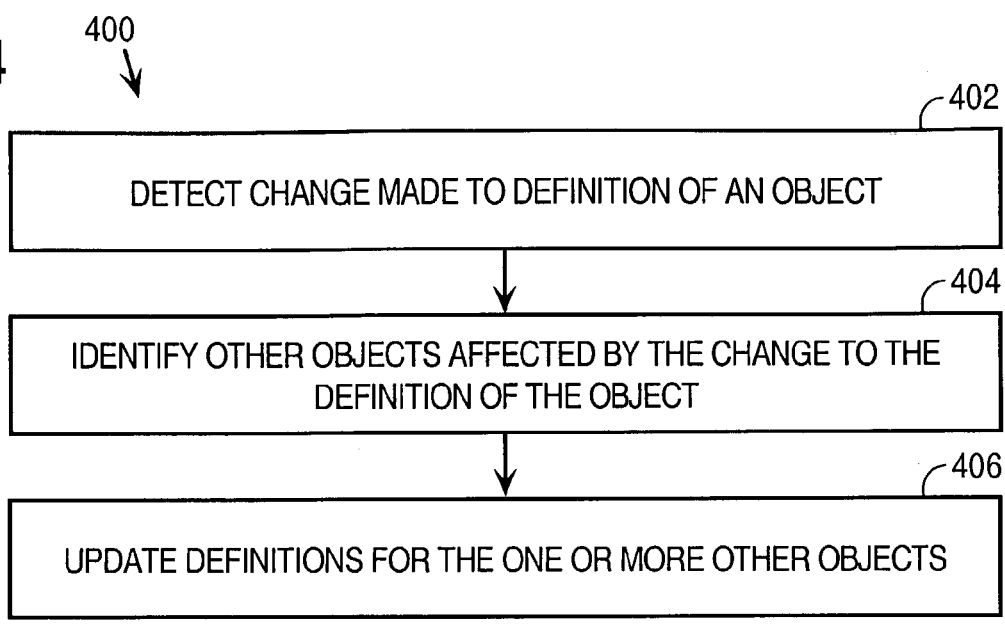
FIG. 4 is a flow diagram that depicts an approach for reconciling a data warehouse, according to another embodiment of the invention.

According to another embodiment of the invention, in response to a change made to the database schemas for source databases 102, 104, 106, the database schema of data warehouse 108 is updated to reflect the change made to the database schemas for source databases 102, 104, 106. FIG. 4 is a flow diagram 400 that depicts an example embodiment of this approach. In step 402, a change is made to the database schema for source database 102 and object 124 is updated to conform to the updated database schema.

In step 404, one or more other objects affected by the change to the database schema for source database 102 are identified. In the present example, object 130 is identified as being affected by the change to the database schema for source database 102 since object 130 is generated, at least in part, from object 124.

In step 406, definitions for the one or more other objects are updated to reflect the change to the database schema for source database 102. In the present example, the database schema for data warehouse 108 is updated to reflect the change made to the database schema for source database 102 so that a new version of object 130 can be generated from a new version of object 124 that conforms to the updated database schema for source database 102.

The aforementioned approaches for reconciling a data warehouse described with respect to FIGS. 2 and 4 are not limited to the specific steps or the specific order of steps as depicted in FIGS. 2 and 4. In some situations some of the steps may not be performed, additional steps may be performed and/or the order may be changed, depending upon the requirements of a particular application. Furthermore, the steps depicted in FIGS. 2 and 4 are not mutually exclusive and may be combined. For example, updating the database schema for data warehouse 108 in response to the change to the database schema for source database 102 may be performed in conjunction with an update to transformation application 304 so that transformation application 304 will reflect the changes made to the database schema for data warehouse 108.

II. DEPENDENCY ANALYSIS

According to one embodiment of the invention, dependency analysis is used to identify other objects affected by a change made to the definition of an object. Dependency analysis is performed based upon a dependency model for a particular type of dependency to be analyzed.

Each dependency model includes a set of dependency rules that govern dependencies between objects. The dependency rules for a particular dependency model may be determined using a variety of approaches and the invention is not limited to any particular type of dependency rules or any particular approach for determining dependency rules. For example, dependency rules may be determined based upon a set of heuristics specified for a particular context.

The objects in a dependency model define the domain of the dependency model. Dependency analysis may be performed on any type of objects, including objects stored in warehouse manager 110, as well as temporary and intermediate objects that may be used by warehouse manager 110 and transformation application 304. For example, transformation application 304 may create and use intermediate objects, for example intermediate database tables, to generate objects stored in data warehouse 108. Changes to the definitions of objects upon which the intermediate objects depend may require a change to how the intermediate objects are defined. Hence, dependency analysis may be used to identify intermediate objects that are affected by changes made to the definitions of objects.

Figure 5:
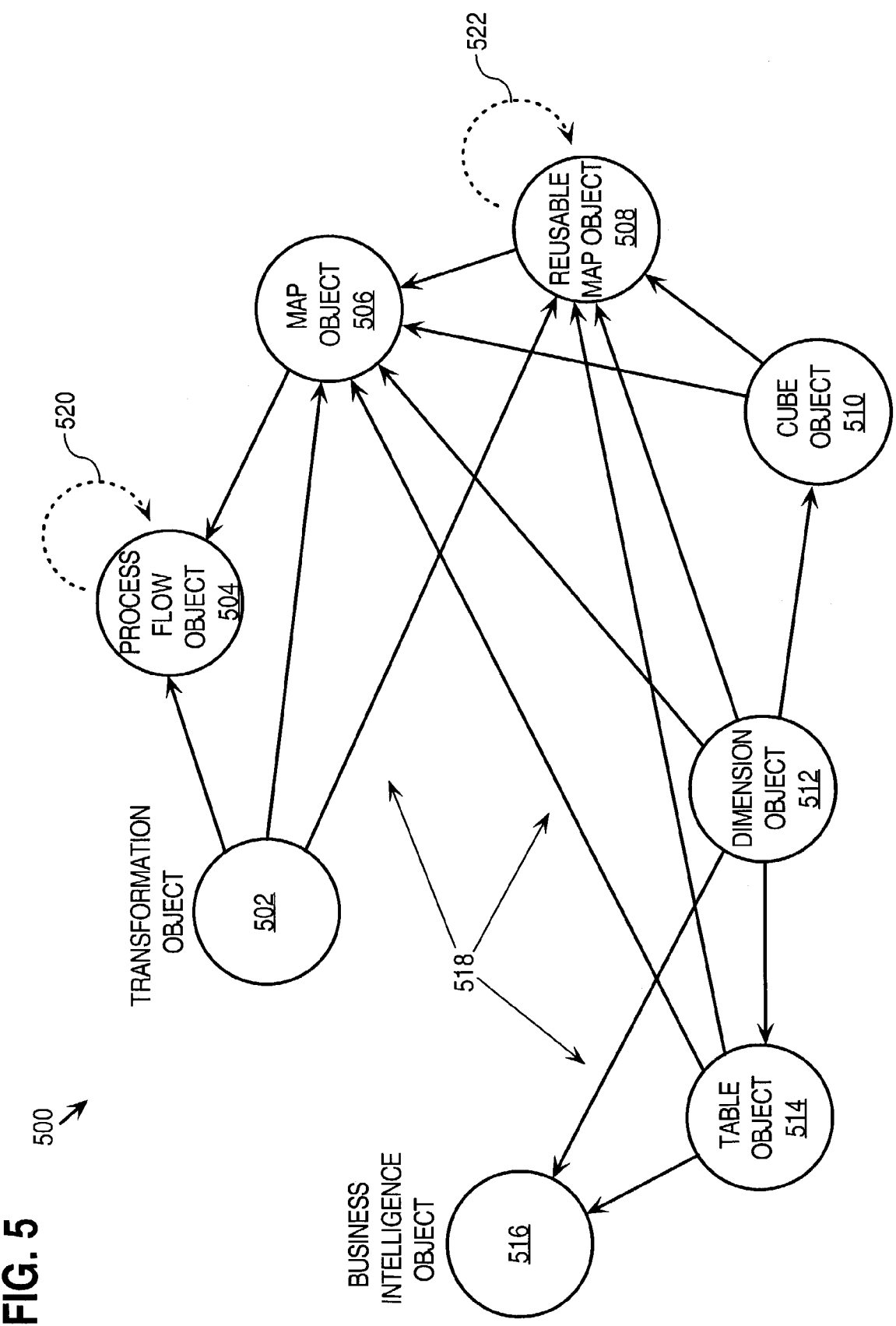
FIG. 5 is a block diagram that depicts a structural dependency model, according to an embodiment of the invention.

FIG. 5 is a block diagram that depicts an example structural dependency model 500 according to an embodiment of the invention. The domain of structural dependency model 500 includes a transformation object 502, a process flow object 504, a map object 506, a reusable map object 508, a cube object 510, a dimension object 512, a table object 514 and a business intelligence object 516. The foregoing objects are example objects and other objects may be used depending upon the requirements of a particular application. The invention is not limited to any particular set or type of objects.

A set of connecting lines 518 depicts dependencies between the aforementioned objects. For each connecting line 518, the arrowhead identifies an object that depends on another object attached to the other end of the connecting line. For example, both map object 506 and business intelligence object 516 depend on table object 514. Accordingly, a change to table object 514 necessitates a change to both business intelligence object 516 and map object 506. Note that process flow object 504 and reusable map object 508 each have a connecting line 520, 522, respectively, to themselves. Connecting lines 520, 522 depict that process flow object 504 may depend upon another process flow object and that reusable map object 508 may depend upon another reusable map object.

Dependency rules may be implemented using different approaches, depending upon the requirements of a particular application. For example, a set of dependency rules may be represented by a set of mathematical equations that define the dependency relationships. In this situation, the set of mathematical equations for table object 514 might be:

$$T \rightarrow M$$

$$T \rightarrow ML, \text{ and}$$

$$T \rightarrow BI$$

where T=table object 514; M=map object 506; ML=reusable map object 508 and the symbol "→" in the equations specifies a dependency. Thus, in the present example, table object 514, map object 506 and reusable map object 508 each depends upon table object 514.

Based upon the dependency model, dependency data, for example a dependency graph, on the object that has been changed (source or warehouse objects), is determined, and hence objects that are affected by the change are identified.

III. DEPENDENCY MANAGEMENT

Figure 6:
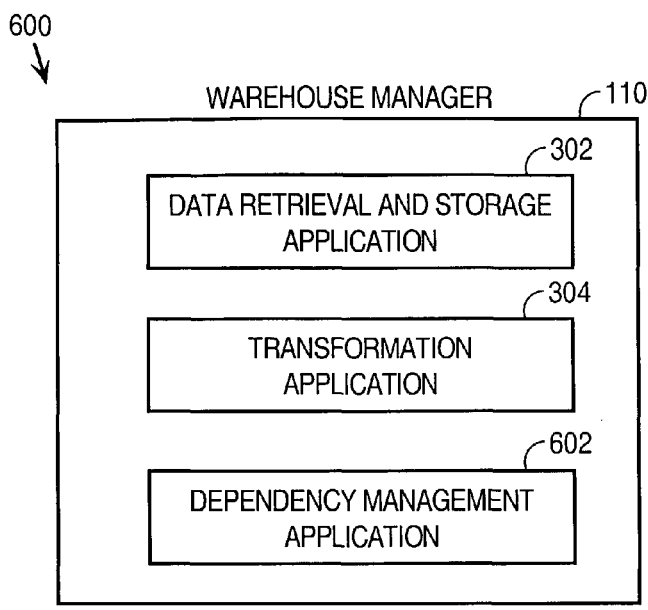
FIG. 6 is a block diagram that depicts a warehouse manager, according to another embodiment of the invention.

FIG. 6 is a block diagram 600 of warehouse manager 110 configured according to an embodiment of the invention. In this embodiment, warehouse manager 110 includes a dependency management application 602 that is configured to manage dependencies among objects. Objects are conventionally defined by metadata that specifies the attributes of an object. In this context, dependency management application 602 is configured to perform metadata dependency management. This involves performing, in response to a change to the definition of an object, dependency analysis to identify other objects affected by the change. For example, suppose that the database schema that defines object 124 is changed. In this situation, dependency management application 602 analyzes the metadata for object 130 to determine whether object 130 is dependent upon the database schema for object 124 and is affected by the change to the database schema for object 124.

According to one embodiment of the invention, dependency management application 602 is further configured to update metadata for the other objects to reflect changes made to the definition of the object. In the present example, dependency management application 602 is configured to update the metadata that defines object 130 to reflect the change made to the database schema that defines object 124.

According to one embodiment of the invention, dependency management application 602 is further configured to update transformation application 304 to reflect changes made to the definition of an object so that transformation application 304 can generate the other objects from new data that conforms to the changed definition of the object. In the present example, dependency management application 602 is further configured to update transformation application 304 so that transformation application 304 can generate new versions of object 130 based upon new versions of object 124 that conform to the updated database schema that defines object 124.

According to one embodiment of the invention, dependency management application 602 is configured to provide, on a Graphical User Interface (GUI), a graphical representation of the dependency graph or graphs of the impacted data warehouse objects built based upon the dependency model and its constituent dependency rules. For example, dependency management application 602 may be configured to generate and display on a GUI a graphical representation of a structural dependency graph based on structural dependency model 500 where each object is represented graphically by a user interface object. Various menus, shapes, colors and even sounds may be used to differentiate objects and their dependencies and the invention is not limited to any particular implementation. This allows administrative personnel to visually examine and analyze a dependency model and its constituent dependency rules.

According to another embodiment of the invention, dependency management application 602 is configured to generate and display on a GUI, a graphical representation of how a change to an object affects a data warehouse. More particularly, dependency management application 602 is configured to cause to be displayed on a GUI, graphical representations of a set of other objects affected by a change to an object. Dependency management application 602 may be configured to perform a wide variety of dependency management functions, depending upon the requirements of a particular application, and the examples provided herein are illustrative and not meant to be exhaustive. For example, dependency management application 602 may be configured to provide, on a GUI, a graphical representation of how one object is affected by other objects.

Figure 7:
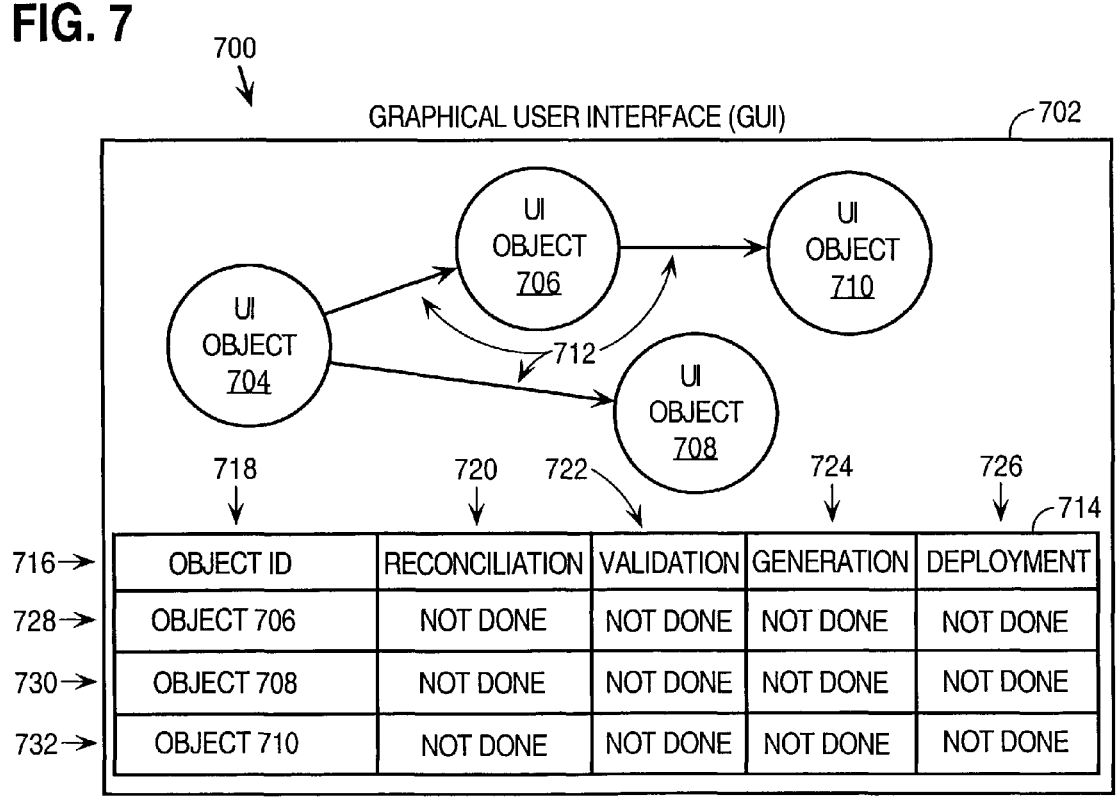
FIG. 7 is a block diagram that depicts a graphical User Interface (GUI) environment for managing dependencies in a data warehouse, according to an embodiment of the invention.

FIG. 7 is a block diagram 700 that includes a GUI 702 on which a graphical representation of how a change to an object affects other objects is depicted, according to an embodiment of the invention. GUI 702 may be implemented in any manner, for example, on a CRT or LCD. A User Interface (UI) object 704 and UI objects 706, 708, 710 are displayed on GUI 702. These UI objects are graphical representations of corresponding data objects. For example, UI object 704 may represent object 124, while UI object 706 represents object 130.

A set of connecting lines 712 indicates dependencies between the data objects corresponding to UI object 704 and UI objects 706, 708, 710. In particular, the data objects corresponding to UI objects 706, 708 are directly dependent upon the data object that corresponds to UI object 704. Thus, a change in the data object corresponding to UI object 704 will require a change to the data objects corresponding to UI objects 706, 708. Connecting lines 712 also indicate that the data object corresponding to UI object 710 is directly dependent upon the data object corresponding to UI object 706. Thus, a change in the data object corresponding to UI object 706 will require a change to the data object corresponding to UI object 710. Connecting lines 712 also indicate that the data object corresponding to UI object 710 is also indirectly dependent on the data object corresponding to the UI object 704.

The particular change that must be made to a data object that depends upon another data object depends upon the type and extent of the change made to the other data object and the attributes of the dependency. For example, in some situations, in response to a change made to a particular data object, another data object does not have to be changed if the change to the particular data object was made to an attribute of the particular data object that the other data object is not dependent upon. As another example, a change to a single attribute of the particular data object may require significant changes to be made to the other data object in situations where the structure of the other data object is very dependent upon the particular attribute of the particular data object that was changed.

A status window 714 is also displayed on GUI 702. Status window 714 includes a heading row 716 that identifies the type of data contained in the columns 718, 720, 722, 724, 726 of status table 714. Column 718 contains object identification (ID) data and columns 720, 722, 724, 726 indicate whether a particular function has been performed for a particular object, namely reconciliation, validation, generation and deployment. In the present example, status table 714 includes rows 728, 730, 732 that correspond to UI objects 706, 708, 710, respectively. Thus, column 720 identifies whether a reconciliation function has been performed for UI objects 706, 708, 710, i.e., whether the data objects corresponding to UI objects 706, 708, 710 have been reconciled to reflect changes made to the data object corresponding to UI object 704. Column 722 identifies whether a validation function has been performed for UI objects 706, 708, 710, i.e., whether the updated data objects corresponding to UI objects 706, 708, 710 have been validated. Column 724 identifies whether a generation function has been performed for UI objects 706, 708, 710, i.e., whether the structure of the data objects corresponding to UI objects 706, 708, 710 has been updated. Finally, column 726 identifies whether a deployment function has been performed for UI objects 706, 708, 710, i.e., whether the updated structure for data objects corresponding to UI objects 706, 708, 710 have been redeployed to data warehouse 108. The aforementioned functions may be performed automatically or manually. For example, all of the updates may be performed automatically by warehouse manager 110. Alternatively, specific actions may be manually selected for specific objects. For example, a pop-up menu may be displayed in association with UI object 710 that indicates a set of functions that may be performed on UI object 710, such as reconciliation. The functions depicted in FIG. 7 and described herein are provided for illustrative purposes and the invention is not limited to any particular functions.

According to one embodiment of the invention, warehouse manager 110 is configured to generate and cause to be displayed on GUI 702 any number of the aforementioned UI objects. Warehouse manager 110 may be further configured to perform a variety of other functions, depending upon the requirements of a particular application. For example, warehouse manager 110 may be configured to perform the aforementioned functions of reconciliation, validation, generation and deployment.

IV. IMPLEMENTATION MECHANISMS

Although embodiments of the invention have been described herein in the context of performing metadata reconciliation in data warehousing applications, the invention is not limited to this context and is applicable to any context where metadata reconciliation is performed. For example, the approach described herein is applicable to performing metadata reconciliation in database system environments.

Figure 8:
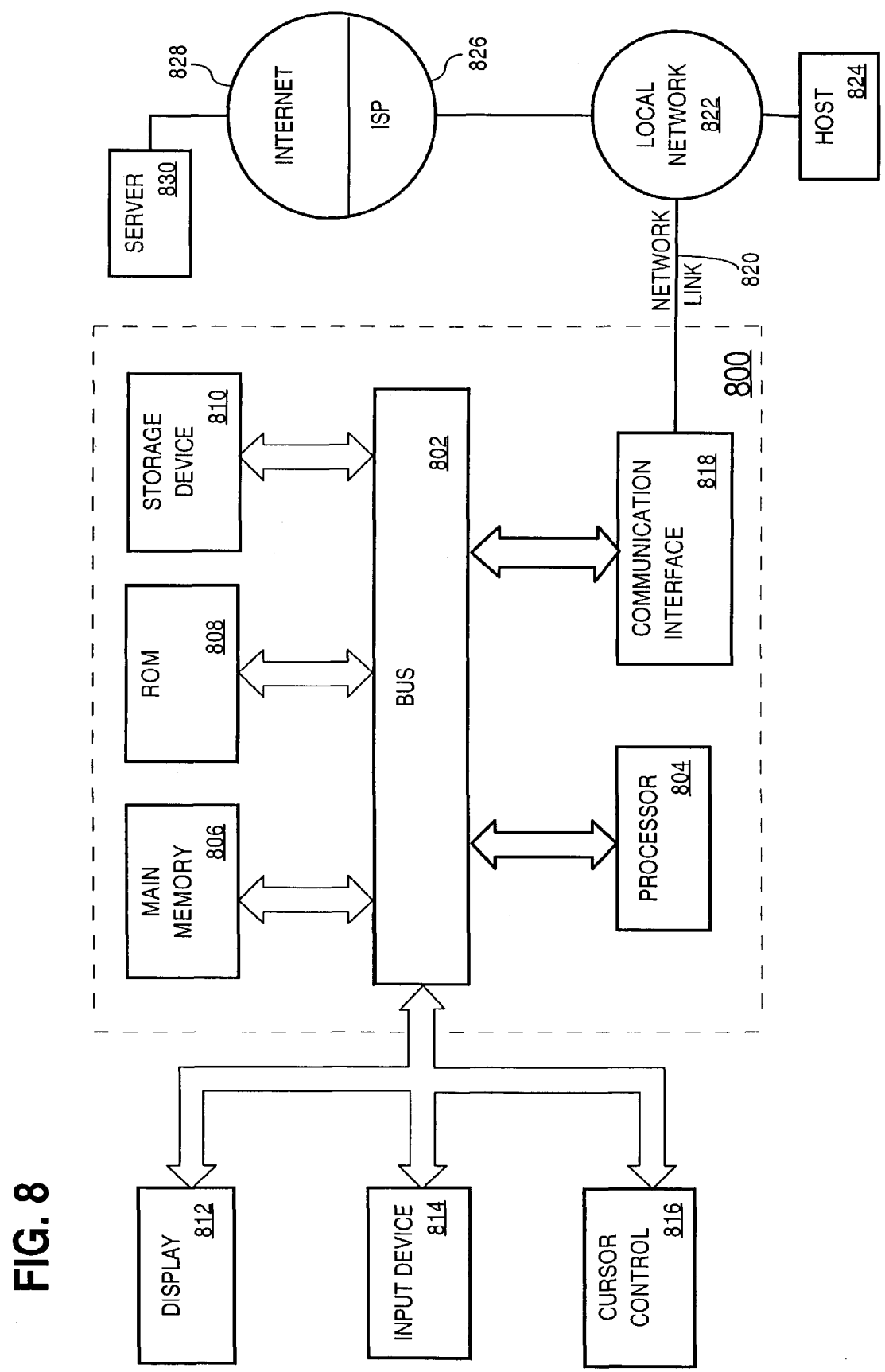
FIG. 8 is a block diagram that depicts a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM)

or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for reconciling a data warehouse. According to one embodiment of the invention, data warehouse reconciliation is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for data warehouse reconciliation as described herein.

The received code may be executed by processor 804 as it is received, and/or stored in storage device 810, or other non-volatile storage for later execution. In this manner, computer system 800 may obtain application code in the form of a carrier wave.

The approach described herein for reconciling a data warehouse provides many benefits including automatic determination of other objects in a data warehouse that need to be updated based upon a change to the definition of an object. The approach also provides for automatic reconciliation of a data warehouse to reflect changes made to an object.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a data warehouse comprising the computer-implemented steps of:
   detecting a change made to a definition of an object;
   in response to detecting the change made to the definition of the object, automatically identifying metadata that is affected by the change made to the definition of the object, wherein the identifying is performed based upon the change made to the definition of the object and upon dependency data that defines one or more dependencies between the definition of the object and the metadata; and
   wherein the metadata defines one or more other objects in the data warehouse that are different than the object; and
   updating the metadata to reflect the change made to the definition of the object.

2. The method as recited in claim 1, wherein:
   the dependency data further defines dependencies between the one or more other objects, and
   the step of automatically identifying the metadata based upon both the change made to the definition of the object and upon dependency data that defines one or more dependencies between the definition of the object and the metadata, includes the step of automatically identifying the one or more other objects based upon both the change made to the definition of the object and upon dependency data that defines both one or more dependencies between the definition of the object and the metadata and one or more dependencies between the one or more other objects defined by the metadata.

3. The method as recited in claim 1, further comprising the computer-implemented step of determining the dependency data based upon a type of function to be performed in response to the identifying of the metadata affected by the changes made to the definition of the object.

4. The method as recited in claim 1, wherein the object includes a database table and the one or more other objects include one or more other database tables.

5. The method as recited in claim 1, further comprising the computer-implemented step of updating a transformation mechanism to reflect the change made to the definition of the object so that the transformation mechanism can generate one or more new versions of the other objects based upon a new version of the object that conforms to the changed definition of the object.

6. The method as recited in claim 1, further comprising the computer-implemented step of generating and displaying on a graphical user interface, a user interface object associated with the object and one or more other user interface objects associated with the one or more other objects, wherein the user interface object and the one or more other user interface objects are displayed on the graphical user interface in a manner that visually depicts dependencies between the object and the one or more other objects.

7. The method as recited in claim 6, further comprising the computer-implemented step of displaying on the graphical user interface the one or more other user interface objects in a manner that visually depicts dependencies between the one or more other objects.

8. The method as recited in claim 6, further comprising the computer-implemented step of in response to detecting a user selection of a particular other object from the one or more other objects, updating particular metadata from the metadata that defines the particular other object to reflect the change made to the definition of the object.

9. The method as recited in claim 6, further comprising the computer-implemented step of in response to detecting a user selection of a particular graphical user interface object displayed on the graphical user interface, updating a transformation mechanism to reflect the change made to the definition of the object so that the transformation mechanism can generate one or more new versions of the other objects from a new version of the object that conforms to the changed definition of the object.

10. A non-transitory computer-readable storage medium for managing a data warehouse, the non-transitory computer-readable storage medium carrying one or more sequences of instructions which, when executed by one or more processors, cause the one or more processors to perform the steps of:
    detecting a change made to a definition of an object;
    in response to detecting the change made to the definition of the object, automatically identifying metadata that is affected by the change made to the definition of the object, wherein the identifying is performed based upon the change made to the definition of the object and upon dependency data that defines one or more dependencies between the definition of the object and the metadata; and
    wherein the metadata defines one or more other objects in the data warehouse that are different than the object; and
    updating the metadata to reflect the change made to the definition of the object.

11. The non-transitory computer-readable storage medium as recited in claim 10, wherein:
    the dependency data further defines dependencies between the one or more other objects, and
    the step of automatically identifying the metadata based upon both the change made to the definition of the object and upon dependency data that defines one or more dependencies between the definition of the object and the metadata, includes the step of automatically identifying the one or more other objects based upon both the change made to the definition of the object and upon dependency data that defines both one or more dependencies between the definition of the object and the metadata and one or more dependencies between the one or more other objects defined by the metadata.

12. The non-transitory computer-readable storage medium as recited in claim 10, further comprising one or more additional instructions which, when executed by the one or more processors, cause the one or more processors to perform the step of determining the dependency data based upon a type of function to be performed in response to the identifying of the metadata affected by the changes made to the definition of the object.

13. The non-transitory computer-readable storage medium as recited in claim 10, wherein the object includes a database table and the one or more other objects include one or more other database tables.

14. The non-transitory computer-readable storage medium as recited in claim 10, further comprising one or more additional instructions which, when executed by the one or more processors, cause the one or more processors to perform the step of updating a transformation mechanism to reflect the change made to the definition of the object so that the transformation mechanism can generate one or more new versions of the other objects based upon a new version of the object that conforms to the changed definition of the object.

15. The non-transitory computer-readable storage medium as recited in claim 10, further comprising one or more additional instructions which, when executed by the one or more processors, cause the one or more processors to perform the step of generating and displaying on a graphical user interface, a user interface object associated with the object and one or more other user interface objects associated with the one or more other objects, wherein the user interface object and the one or more other user interface objects are displayed on the graphical user interface in a manner that visually depicts dependencies between the object and the one or more other objects.

16. The non-transitory computer-readable storage medium as recited in claim 15, further comprising one or more additional instructions which, when executed by the one or more processors, cause the one or more processors to perform the step of displaying on the graphical user interface the one or more other user interface objects in a manner that visually depicts dependencies between the one or more other objects.

17. The non-transitory computer-readable storage medium as recited in claim 15, further comprising one or more additional instructions which, when executed by the one or more processors, cause the one or more processors to perform the step of in response to detecting a user selection of a particular other object from the one or more other objects, updating particular metadata from the metadata that defines the particular other object to reflect the change made to the definition of the object.

18. The non-transitory computer-readable storage medium as recited in claim 15, further comprising one or more additional instructions which, when executed by the one or more processors, cause the one or more processors to perform the step of in response to detecting a user selection of a particular graphical user interface object displayed on the graphical user interface, updating a transformation mechanism to reflect the change made to the definition of the object so that the transformation mechanism can generate one or more new versions of the other objects from a new version of the object that conforms to the changed definition of the object.

19. A computer system for managing a data warehouse, the computer system comprising a memory that includes one or more sequences of instructions which, when executed by one or more processors, cause the one or more processors to perform the steps of:
  detecting a change made to a definition of an object;
  in response to detecting the change made to the definition of the object, automatically identifying metadata that is affected by the change made to the definition of the object, wherein the identifying is performed based upon the change made to the definition of the object and upon dependency data that defines one or more dependencies between the definition of the object and the metadata; and
  wherein the metadata defines one or more other objects in the data warehouse that are different than the object; and
  updating the metadata to reflect the change made to the definition of the object.

20. The computer system as recited in claim 19, wherein:
  the dependency data further defines dependencies between the one or more other objects, and
  the step of automatically identifying the metadata based upon both the change made to the definition of the object and upon dependency data that defines one or more dependencies between the definition of the object and the metadata, includes the step of automatically identifying the one or more other objects based upon both the change made to the definition of the object and upon dependency data that defines both one or more dependencies between the definition of the object and the metadata and one or more dependencies between the one or more other objects defined by the metadata.

21. The computer system as recited in claim 19, wherein the memory further comprises one or more additional instructions which, when executed by the one or more processors, cause the one or more processors to perform the step of determining the dependency data based upon a type of function to be performed in response to the identifying of the metadata affected by the changes made to the definition of the object.

22. The computer system as recited in claim 19, wherein the object includes a database table and the one or more other objects include one or more other database tables.

23. The computer system as recited in claim 19, wherein the memory further comprises one or more additional instructions which, when executed by the one or more processors, cause the one or more processors to perform the step of updating a transformation mechanism to reflect the change made to the definition of the object so that the transformation mechanism can generate one or more new versions of the other objects based upon a new version of the object that conforms to the changed definition of the object.

24. The computer system as recited in claim 19, wherein the memory further comprises one or more additional instructions which, when executed by the one or more processors, cause the one or more processors to perform the step of generating and displaying on a graphical user interface, a user interface object associated with the object and one or more other user interface objects associated with the one or more other objects, wherein the user interface object and the one or more other user interface objects are displayed on the graphical user interface in a manner that visually depicts dependencies between the object and the one or more other objects.

25. The computer system as recited in claim 24, wherein the memory further comprises one or more additional instructions which, when executed by the one or more processors, cause the one or more processors to perform the step of displaying on the graphical user interface the one or more other user interface objects in a manner that visually depicts dependencies between the one or more other objects.

26. The computer system as recited in claim 24, wherein the memory further comprises one or more additional instructions which, when executed by the one or more processors, cause the one or more processors to perform the step of in response to detecting a user selection of a particular other object from the one or more other objects, updating particular metadata from the metadata that defines the particular other object to reflect the change made to the definition of the object.

27. The computer system as recited in claim 24, wherein the memory further comprises one or more additional instructions which, when executed by the one or more processors, cause the one or more processors to perform the step of in response to detecting a user selection of a particular graphical user interface object displayed on the graphical user interface, updating a transformation mechanism to reflect the change made to the definition of the object so that the transformation mechanism can generate one or more new versions of the other objects from a new version of the object that conforms to the changed definition of the object.

28. A method for identifying metadata to be reconciled, the method comprising the computer-implemented steps of:
  detecting a change made to a definition of an object;
  in response to detecting the change made to the definition of the object, automatically identifying metadata that is affected by the change made to the definition of the object, wherein the identifying is performed based upon the change made to the definition of the object and upon dependency data that defines one or more dependencies between the definition of the object and the metadata; and wherein the metadata defines one or more other objects in the data warehouse that are different than the object; and updating the metadata to reflect the change made to the definition of the object.

29. The method as recited in claim 28, further comprising the computer-implemented step of updating a transformation mechanism to reflect the change made to the definition of the object so that the transformation mechanism can generate one or more new versions of the other objects based upon a new version of the object that conforms to the changed definition of the object.

30. A non-transitory computer-readable storage medium for identifying metadata to be reconciled, the non-transitory computer-readable storage medium carrying one or more sequences of instructions which, when executed by one or more processors, cause the one or more processors to perform the steps of:

detecting a change made to a definition of an object;

in response to detecting the change made to the definition of the object, automatically identifying metadata that is affected by the change made to the definition of the object, wherein the identifying is performed based upon the change made to the definition of the object and upon dependency data that defines one or more dependencies between the definition of the object and the metadata; and wherein the metadata defines one or more other objects in the data warehouse that are different than the object; and updating the metadata to reflect the change made to the definition of the object.

31. The non-transitory computer-readable storage medium as recited in claim 30, further comprising one or more additional instructions which, when executed by the one or more processors, cause the one or more processors to perform the step of updating a transformation mechanism to reflect the change made to the definition of the object so that the transformation mechanism can generate one or more new versions of the other objects based upon a new version of the object that conforms to the changed definition of the object.

32. An apparatus for identifying metadata to be reconciled, the apparatus comprising:

one or more computer processors;

means for detecting a change made to a definition of an object;

means for in response to detecting the change made to the definition of the object, automatically identifying metadata that is affected by the change made to the definition of the object, wherein the identifying is performed based upon the change made to the definition of the object and upon dependency data that defines one or more dependencies between the definition of the object and the metadata; and wherein the metadata defines one or more other objects in the data warehouse that are different than the object; and means for updating the metadata to reflect the change made to the definition of the object.

33. The apparatus as recited in claim 32, further comprising means for updating a transformation mechanism to reflect the change made to the definition of the object so that the transformation mechanism can generate one or more new versions of the other objects based upon a new version of the object that conforms to the changed definition of the object.

* * * * *